United States Patent Office 2,762,646
Patented Sept. 11, 1956

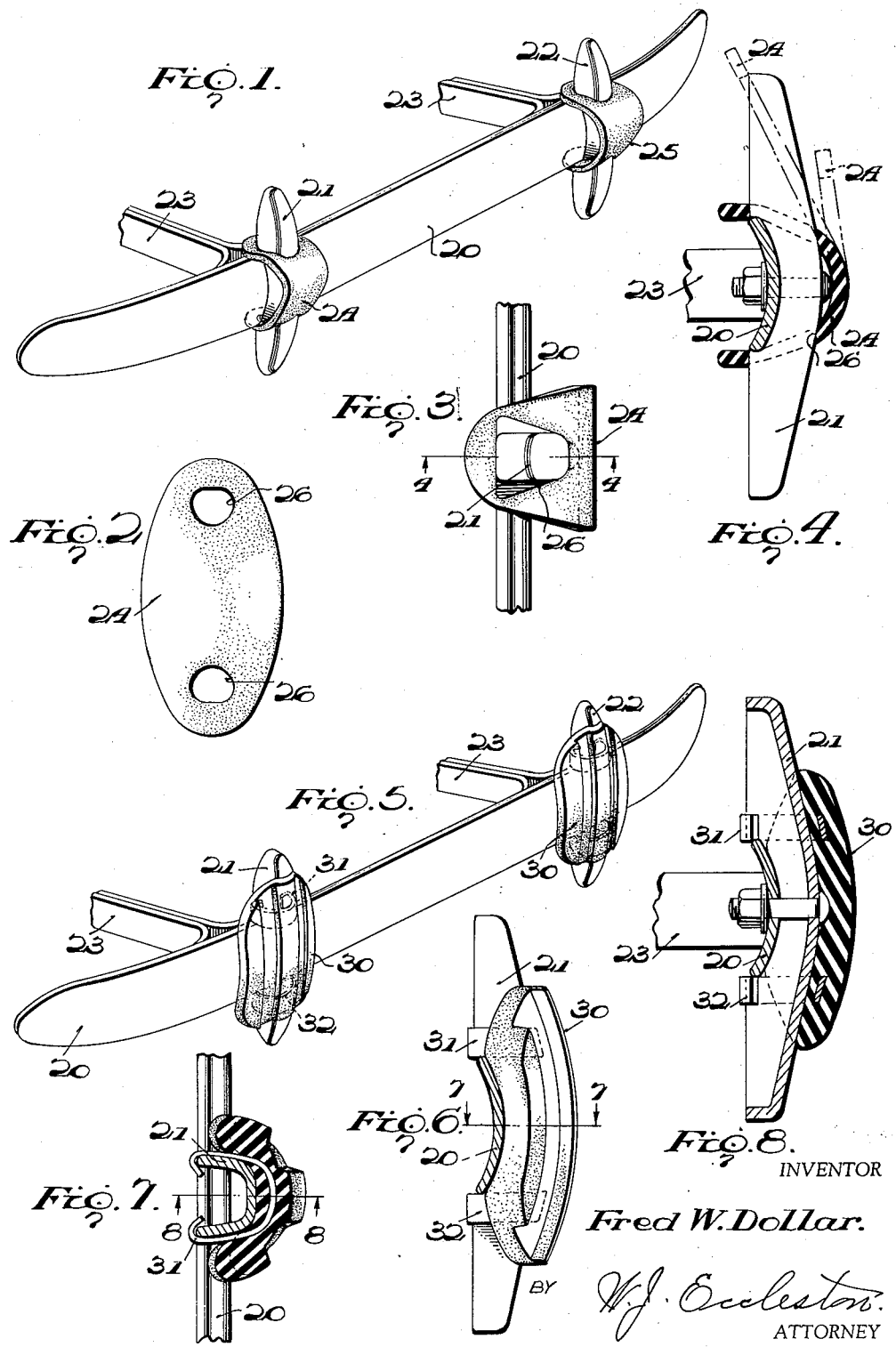

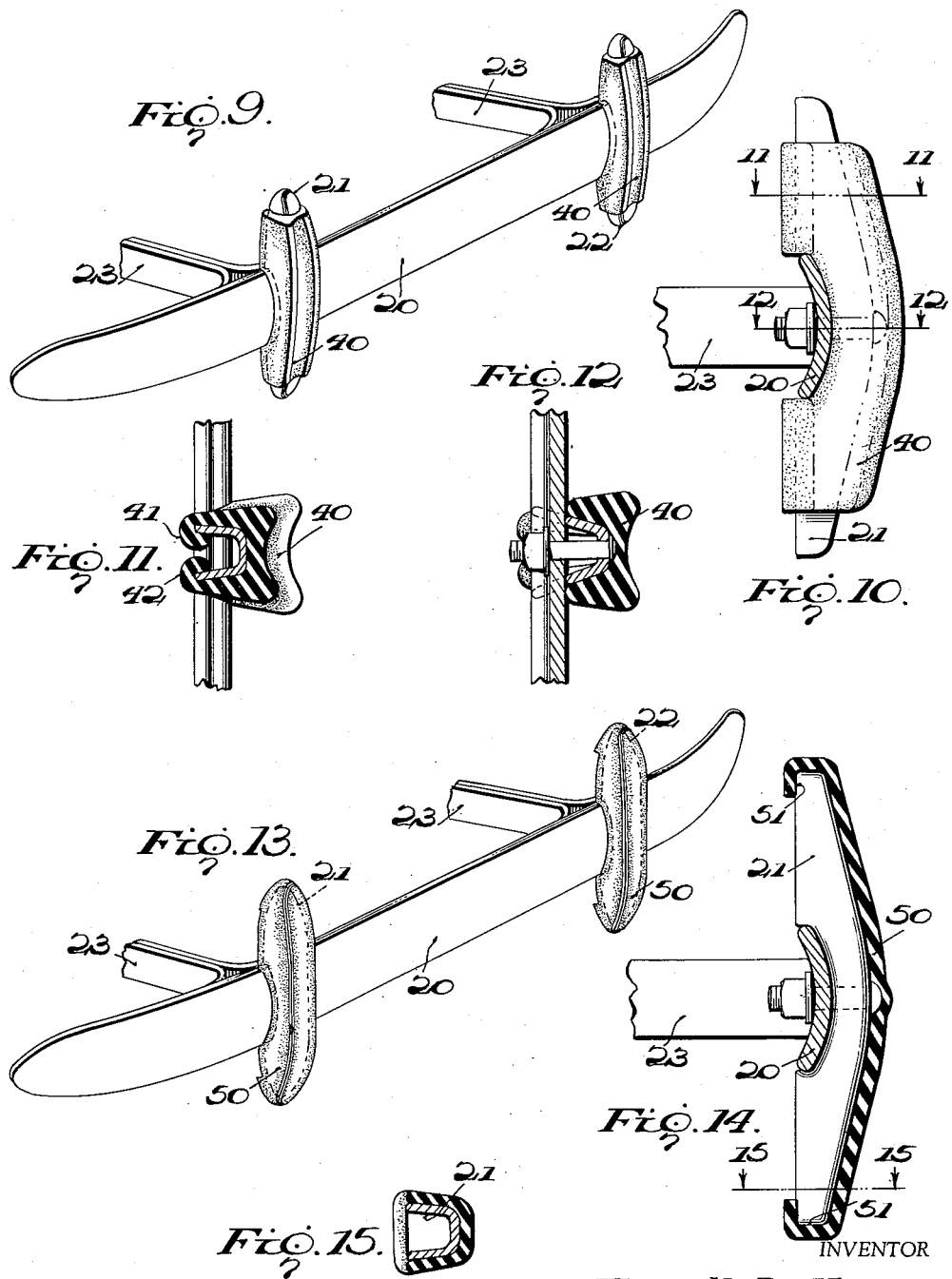

2,762,646

RESILIENT BUMPER GUARD PROTECTOR

Fred W. Dollar, Henderson, Tex.

Application March 4, 1953, Serial No. 340,416

1 Claim. (Cl. 293—71)

(Granted under Title 35, U. S. Code (1952), sec. 266)

The invention described herein, if patented, may be manufactured and used by or for the Government for governmental purposes without the payment to me of any royalty thereon.

This invention relates to bumper protectors for automobiles, trucks and other road vehicles.

As is well known, nearly all motor vehicles in the United States are provided with bumpers or shock-absorbing fenders which are usually plated with brightly polished metal. These bumpers are easily scratched, causing the base metal (steel) to be exposed, which results in rusty scratches that mar the appearance of the bumpers. Also hard blows against objects presenting edges or corners will not infrequently dent or bend the bumpers, again detracting from their appearance.

Among other objects, the invention aims to provide attachments for bumpers, especially bumper guards, which will minimize scratching and will usually prevent denting of the bumpers, making it possible for a car equipped with the attachments to push another car, or be pushed from the rear, without damage to its bumpers. Attachments embodying the invention will absorb some of the impact of a collision and may lessen the damage resulting therefrom.

A further object is to provide bumper attachments which may be applied and removed by hand, that is, either without tools or with implements of the simplest construction, and without change or modification of any part of the bumper.

Additional objects are to provide bumper attachments which are easily manufactured by automatic machinery, are relatively inexpensive, may be of many different colors so as either to contrast with or blend with the bumpers, and may be made so as to cover the bumper guards, that is, the vertical members which are normally affixed to the horizontal bumper bar.

This application is a companion to application Ser. No. 315,216 filed on October 16, 1952.

In the accompanying drawings showing several forms of the invention,

Fig. 1 is a perspective view of a bumper with two bumper guards protected by an embodiment of the invention, the bumper-attaching brackets being mostly omitted;

Fig. 2 is an elevation of one of the bumper guard protectors shown in Fig. 1, but on a larger scale;

Fig. 3 is a top plan view, on the scale of Fig. 2, of a protector shown applied to a bumper guard, part of the bumper also being shown;

Fig. 4 is a section on line 4—4 of Fig. 3, showing in phantom two positions of the protector while being installed or removed from the bumper guard;

Fig. 5 is a perspective view of a bumper with another form of protector for the bumper guards;

Fig. 6 is an enlarged sectional elevation showing the protector of Fig. 5 on a bumper;

Fig. 7 is a horizontal section on line 7—7 of Fig. 6;

Fig. 8 is a section on line 8—8 of Fig. 7;

Fig. 9 is a perspective view of a bumper with still another embodiment of protector installed thereon;

Fig. 10 is an enlarged sectional elevation showing the protector of Fig. 9 on a bumper;

Fig. 11 is a horizontal section on line 11—11 of Fig. 10;

Fig. 12 is a horizontal section on line 12—12 of Fig. 10;

Fig. 13 is a perspective view of a bumper with still another form of protector installed thereon;

Fig. 14 is an enlarged sectional elevation showing the protector of Fig. 13; and Fig. 15 is a horizontal section on line 15—15 of Fig. 14.

Referring first to Figs. 1, 2, 3 and 4, the bumper bar 20 has bolted thereon the usual pair of bumper guards 21, 22 which extend vertically above and below the general plane of the bumper to protect the car or truck against blows from other cars or objects. The brackets 23 or other elements for securing the bumper bar to the chassis or body of the car or truck are not fully shown as they have no bearing on the invention.

Secured upon the outer surfaces of the bumper guards are a pair of resilient protectors 24, 25 respectively, each protector being a solid elastomer (preferably rubber) body of an elongated or elliptical shape having apertures 26 near either end. The resilience of the rubber body is such that it may be stretched, as indicated in Fig. 4, thereby to place one of the protectors on the bumper guard or remove it. When putting a protector on the bumper, the user inserts one of the prongs, preferably the lower prong, of the bumper guard through the lower aperture 26 of the protector, and then stretches the protector until its other aperture 26 receives the other prong of the bumper guard. If necessary, a stick or lever may be used to facilitate stretching the protector, both when applying and removing it. When the tension is relieved, the rubber protector will resume its normal shape, shown in full lines.

Referring to Figs. 5, 6, 7 and 8, where an alternative form of bumper protector is shown, the protectors 30 are each solid rubber or elastomer bodies having molded therein a pair of metal attaching pieces 31, 32 whose ends are bent manually or by pliers or similar tools to provide inturned ends adapted to hook onto the bumper guards. These metal hooks may be made of soft brass, copper or other easily bent non-rusting metal.

Referring to Figs. 9–12, the protectors 40 are solid elastic elastomer bodies having molded hook-like flanges 41, 42 which engage behind the rear edges of the hollow metal bumper guards, as best shown in Fig. 11. Flanges 41, 42 terminate short of the bumper and preferably directly engage the top and bottom edges of the bumper, as shown in Fig. 10. Installation is effected by bending the protectors laterally so as to separate the hook-like flanges. To make lateral bending easier, longitudinally extending grooves or thin areas may be provided in the protector bodies 40, as shown. This form of the invention is advantageous compared with the form of Figs. 5–8 because it uses no metal; also, it is more massive and affords more protection than the lighter and less expensive elastomer body shown in Figs. 1–4.

Referring to Figs. 13–15, the protector 50 completely covers the exposed surfaces of the bumper guard as it surrounds the bumper guard on three sides and fits over the top and bottom tapered ends. At each end the protector 50 is formed with re-entrant portions or pockets 51 which fit snugly over the ends of the bumper guard. This form, like the form of Figs. 1–4, will require longitudinal stretching in order to install it. Conveniently, the lower pocket will be hooked first over the lower bumper guard end, then the protector will be pulled to stretch it over the top end of the bumper guard.

The described bumper protectors may have any color which a rubber or rubber-like material may be given, thereby either to blend with a painted bumper (which is advantageous with military vehicles) or to have a pleasing color contrast with an ordinary brightly polished bumper. The elastomer selected for the protectors will either be vulcanized rubber, or a synthetic rubber or rubber blend having toughness and pronounced elasticity, plus the ability to resist aging when exposed to sunlight.

All of the described forms of protector are characterized by a cushioning elastomer body having hooks or hook-like means for temporarily securing the body upon the outer or forward face of the bumper guard. All the forms are readily mounted upon and dismounted from the bumper guards either with the aid of simple tools or, where the elasticity permits, without the aid of any tools whatever.

Obviously the invention may be embodied in other forms neither described nor shown.

What I claim is:

A bumper protector comprising an elongated longitudinally stretchable cushioning body of substantial mass adapted to cover at least partially the outer or exposed surfaces of a bumper guard and having two spaced apart apertures near its ends, which apertures are of such size and spacing as to permit the ends of the bumper guard to enter when the protector is stretched lengthwise, the walls of said apertures being readily stretchable to expand and frictionally grip the bumper guard to secure the protector on the bumper guard.

References Cited in the file of this patent

UNITED STATES PATENTS

| | | |
|---|---|---|
| 1,881,231 | Jackson | Oct. 4, 1932 |
| 2,144,167 | Sanders | Jan. 17, 1939 |
| 2,271,046 | Sing | Jan. 27, 1942 |
| 2,624,607 | Weigand | Jan. 6, 1953 |

OTHER REFERENCES

Popular Mechanics, February 1940, vol. 73, No. 2, p. 320. (Copy is available in Scientific Library of the Patent Office.)

Popular Mechanics, September 1941, vol. 76, No. 3, p. 158. (Copy is available in Scientific Library of the Patent Office.)